United States Patent
Oda et al.

(10) Patent No.: US 10,202,891 B2
(45) Date of Patent: Feb. 12, 2019

(54) PRECOMBUSTION CHAMBER GAS ENGINE

(71) Applicant: Mitsubishi Heavy Industries, Ltd., Tokyo (JP)

(72) Inventors: Yuji Oda, Tokyo (JP); Kengo Tanaka, Tokyo (JP); Akihiro Yuuki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 451 days.

(21) Appl. No.: 14/418,915

(22) PCT Filed: Sep. 19, 2013

(86) PCT No.: PCT/JP2013/075309
§ 371 (c)(1),
(2) Date: Jan. 30, 2015

(87) PCT Pub. No.: WO2014/046185
PCT Pub. Date: Mar. 27, 2014

(65) Prior Publication Data
US 2015/0184578 A1    Jul. 2, 2015

(30) Foreign Application Priority Data
Sep. 20, 2012  (JP) .................................. 2012-207340

(51) Int. Cl.
*F02B 19/18*     (2006.01)
*F02B 19/12*     (2006.01)
(Continued)

(52) U.S. Cl.
CPC .............. *F02B 19/18* (2013.01); *F02B 19/12* (2013.01); *F02D 19/02* (2013.01); *F02B 23/101* (2013.01); *Y02T 10/125* (2013.01); *Y02T 10/32* (2013.01)

(58) Field of Classification Search
CPC ........ F02B 19/18; F02B 19/12; F02B 23/101; F02D 19/02; Y02T 10/125; Y02T 10/32
(Continued)

(56) References Cited
U.S. PATENT DOCUMENTS 1,753,253 A * 4/1930 Tacchella .................. F02B 7/02
123/260
2,422,610 A * 6/1947 Bagnulo .................... F02B 1/00
123/255
(Continued)

FOREIGN PATENT DOCUMENTS

JP      2153221 A      6/1990
JP      H07293344 A    11/1995
(Continued)

OTHER PUBLICATIONS

Decision to Grant a Patent, App. No. JP2012-207340, Drafting Date Dec. 7, 2016, dated Dec. 16, 2016, 6 Pages.
(Continued)

*Primary Examiner* — Thomas Moulis
*Assistant Examiner* — John Bailey
(74) *Attorney, Agent, or Firm* — Berkeley Law & Technology Group, LLP (57) ABSTRACT

An object is to provide a precombustion-chamber gas engine in which occurrence of knocking is restricted. The precombustion-chamber gas engine includes: a cylinder; a cylinder head; a piston delimiting a main combustion chamber with the cylinder head; a precombustion-chamber cap delimiting a precombustion chamber inside thereof and including a plurality of nozzle holes through which the precombustion chamber is in communication with the main combustion chamber; an intake valve for opening and closing an intake port that opens on the cylinder head; and an exhaust valve for opening and closing an exhaust port that opens on the
(Continued)

cylinder head. In a planar view where the cylinder head is seen from below, there are at least one intake-side nozzle hole and at least one exhaust-side nozzle hole, and a total nozzle-hole area of the at least one intake-side nozzle hole is larger than that of the at least one exhaust-side nozzle hole.

5 Claims, 4 Drawing Sheets

(51) Int. Cl.
  *F02D 19/02* (2006.01)
  *F02B 23/10* (2006.01)
(58) Field of Classification Search
  USPC ....... 123/280, 286, 291, 293, 256, 260, 266, 123/287, 295, 305, 575, 576, 578; 701/104
  See application file for complete search history.

(56) References Cited

U.S. PATENT DOCUMENTS

| | | | | |
|---|---|---|---|---|
| 2,884,913 A * | 5/1959 | Heintz | F02B 3/00 123/273 |
| 3,102,521 A * | 9/1963 | Slemmons | F02M 69/00 123/263 |
| 4,076,000 A * | 2/1978 | Goto | F02B 19/1066 123/263 |
| 4,077,366 A * | 3/1978 | Hideg | F02B 53/06 123/203 |
| 4,077,368 A * | 3/1978 | Abthoff | F02B 19/1014 123/259 |
| 4,080,938 A * | 3/1978 | Noguchi | F02B 19/1066 123/268 |
| 4,085,713 A * | 4/1978 | Noguchi | F02B 19/1066 123/261 |
| 4,124,000 A * | 11/1978 | Genslak | F02B 3/00 123/256 |
| 4,218,993 A * | 8/1980 | Blackburn | F02B 19/1095 123/143 B |
| 4,239,023 A * | 12/1980 | Simko | F02B 19/1085 123/275 |
| 4,270,499 A * | 6/1981 | Frelund | F02B 19/18 123/260 |
| 4,301,825 A * | 11/1981 | Simko | F02B 19/1085 123/275 |
| 4,320,727 A * | 3/1982 | Artman | F02B 19/12 123/260 |
| 4,416,228 A * | 11/1983 | Benedikt | F02B 19/1009 123/169 EL |
| 4,442,807 A * | 4/1984 | Latsch | F02B 19/1009 123/254 |
| 4,467,759 A * | 8/1984 | Artman | F02B 19/1028 123/260 |
| 4,483,291 A * | 11/1984 | Artman | F02B 19/12 123/260 |
| 4,491,104 A * | 1/1985 | Fujii | F02B 19/1028 123/291 |
| 4,619,229 A * | 10/1986 | Imoto | F02B 19/18 123/259 |
| 4,712,525 A * | 12/1987 | Ishida | F02B 19/12 123/145 A |
| 4,892,070 A * | 1/1990 | Kuhnert | F02B 19/1066 123/266 |
| 4,977,873 A * | 12/1990 | Cherry | F02B 19/12 123/266 |
| 5,024,193 A * | 6/1991 | Graze, Jr. | F02D 41/0027 123/259 |
| 5,050,550 A * | 9/1991 | Gao | F02B 11/00 123/275 |
| 5,067,458 A * | 11/1991 | Bailey | F02B 19/02 123/292 |
| 5,085,189 A * | 2/1992 | Huang | F02B 19/1004 123/257 |
| 5,105,780 A * | 4/1992 | Richardson | H01T 13/54 123/169 PA |
| 5,222,993 A * | 6/1993 | Crane | F02B 19/12 123/256 |
| 5,293,851 A * | 3/1994 | Schaub | F02B 19/08 123/256 |
| 5,392,744 A * | 2/1995 | Regueiro | F02B 19/18 123/262 |
| 5,522,357 A * | 6/1996 | Nogi | F02B 1/10 123/261 |
| 5,533,476 A * | 7/1996 | Anderson | F02B 19/1009 123/267 |
| 5,554,908 A * | 9/1996 | Kuhnert | F02B 19/12 123/260 |
| 5,570,665 A * | 11/1996 | Regueiro | F01L 1/143 123/90.27 |
| 5,609,130 A * | 3/1997 | Neumann | F02B 19/1004 123/267 |
| 5,611,307 A * | 3/1997 | Watson | F02B 19/1014 123/254 |
| 5,662,082 A * | 9/1997 | Black | F02B 19/1009 123/254 |
| 5,752,481 A * | 5/1998 | Faulkner | F02B 19/1009 123/294 |
| 5,778,849 A * | 7/1998 | Regueiro | F02B 19/1004 123/254 |
| 5,915,351 A * | 6/1999 | Regueiro | F02B 19/16 123/254 |
| 5,924,402 A * | 7/1999 | Regueiro | F02B 19/108 123/254 |
| 5,947,076 A * | 9/1999 | Srinivasan | F02B 19/12 123/256 |
| 5,950,593 A * | 9/1999 | Matsuoka | F02B 19/02 123/292 |
| 6,016,785 A * | 1/2000 | Divecha | F02B 19/1004 123/254 |
| 6,019,081 A * | 2/2000 | Divecha | F02B 19/12 123/254 |
| 6,065,441 A * | 5/2000 | Regueiro | F02B 19/18 123/269 |
| 6,575,192 B1* | 6/2003 | Shaffer | F02B 19/12 137/514.5 |
| 6,843,220 B2* | 1/2005 | Lausch | F02B 1/12 123/255 |
| 6,854,439 B2* | 2/2005 | Regueiro | F02B 19/08 123/193.6 |
| 7,082,920 B2* | 8/2006 | Robinet | F02B 19/12 123/260 |
| 7,100,567 B1* | 9/2006 | Bailey | F02B 19/06 123/268 |
| 7,204,225 B2* | 4/2007 | Kubo | F02B 17/005 123/260 |
| 7,261,097 B2* | 8/2007 | Gong | F02B 19/1023 123/568.12 |
| 7,387,103 B2* | 6/2008 | Merritt | F02B 19/08 123/253 |
| 8,006,666 B2* | 8/2011 | Ashida | F02B 19/12 123/267 |
| 8,074,620 B2* | 12/2011 | Filipek | F02B 23/0657 123/143 B |
| 8,365,689 B2* | 2/2013 | Gruber | F01P 3/16 123/169 PA |
| 8,567,369 B2* | 10/2013 | Johnson | F02B 19/1009 123/260 |
| 8,662,053 B2* | 3/2014 | LaPointe | F02B 19/12 123/266 |
| 8,757,127 B2* | 6/2014 | Ishida | F01P 3/16 123/254 |
| 8,813,716 B2* | 8/2014 | Herold | F01P 3/12 123/254 |
| 8,839,762 B1* | 9/2014 | Chiera | F02B 19/108 123/256 |

(56) References Cited

U.S. PATENT DOCUMENTS

| | | | | |
|---|---|---|---|---|
| 8,857,405 B2* | 10/2014 | Attard | ..................... | F02B 19/12 123/261 |
| 9,316,143 B2* | 4/2016 | Taliaferro | ............... | F02B 19/00 |
| 9,567,939 B2* | 2/2017 | Pouring | ..................... | F02F 1/00 |
| 2002/0104507 A1* | 8/2002 | Riggs | ..................... | F02B 19/12 123/266 |
| 2003/0200939 A1* | 10/2003 | Hiltner | ..................... | F02B 43/10 123/3 |
| 2006/0005803 A1* | 1/2006 | Robinet | ................. | F02B 19/12 123/267 |
| 2006/0219210 A1* | 10/2006 | Bailey | ..................... | F02B 19/06 123/259 |
| 2007/0000472 A1* | 1/2007 | Gong | ................. | F02B 19/1023 123/274 |
| 2007/0119409 A1* | 5/2007 | Johng | ..................... | F02F 1/242 123/267 |
| 2007/0144459 A1* | 6/2007 | Fiveland | ................. | F02B 1/12 123/3 |
| 2007/0221164 A1* | 9/2007 | Ashida | ..................... | F02B 19/12 123/267 |
| 2008/0017165 A1* | 1/2008 | Schubert | ................. | F02B 19/12 123/254 |
| 2009/0120385 A1* | 5/2009 | Munshi | ..................... | C10L 3/06 123/3 |
| 2009/0241896 A1* | 10/2009 | Fiveland | ................. | F02B 7/06 123/305 |
| 2010/0132660 A1* | 6/2010 | Nerheim | ............. | F02B 19/1014 123/260 |
| 2011/0297121 A1* | 12/2011 | Kraus | ................. | F02B 19/1023 123/260 |
| 2012/0103302 A1* | 5/2012 | Attard | ..................... | F02B 19/12 123/260 |
| 2012/0125287 A1* | 5/2012 | Chiera | ..................... | F02B 19/12 123/254 |
| 2012/0160221 A1* | 6/2012 | Munshi | ..................... | C10L 3/06 123/575 |
| 2013/0000598 A1* | 1/2013 | Tokuoka | ............. | F02B 19/1023 123/254 |
| 2013/0139784 A1* | 6/2013 | Pierz | ................. | F02B 19/1009 123/254 |
| 2013/0160734 A1* | 6/2013 | Redtenbacher | ..... | F02B 19/1004 123/253 |
| 2014/0196686 A1* | 7/2014 | Coldren | ................. | F02B 19/12 123/299 |
| 2014/0209057 A1* | 7/2014 | Pouring | ................. | F02B 19/12 123/257 |
| 2015/0068489 A1* | 3/2015 | Bunce | ................. | F02B 19/1057 123/262 |
| 2015/0198117 A1* | 7/2015 | Herold | ............... | F02M 21/0242 123/468 |
| 2016/0010538 A1* | 1/2016 | Suzuki | ............... | F02B 19/1085 123/292 |

FOREIGN PATENT DOCUMENTS

| | | |
|---|---|---|
| JP | H1047096 A | 2/1998 |
| JP | 2000027781 A | 1/2000 |
| JP | 2000073769 A | 3/2000 |
| JP | 2001227344 A | 8/2001 |
| JP | 2001-263069 A | 9/2001 |
| JP | 2004251213 A | 9/2004 |
| JP | 2006-177248 A | 7/2006 |
| JP | 2007-113534 A | 5/2007 |
| JP | 2007-297942 A | 11/2007 |
| JP | 2009197704 A | 9/2009 |
| JP | 2012047115 A | 3/2012 |
| JP | 2012-137083 A | 7/2012 |
| WO | WO 2014/046185 | 3/2014 |

OTHER PUBLICATIONS

SIPO, First Office Action, App. No. 201380040297.8, dated Jun. 13, 2016, 11 Pages.

EPO, European Search Report, App. No. 13839517.3, Filed Jan. 27, 2015, dated Jun. 17, 2015, 6 Pages.

EPO, European Search Report, App. No. PCT/JP2013/075309, Filed Sep. 19, 2013, dated Jun. 17, 2015, 6 Pages.

PCT, Notification Concerning Transmittal of International Preliminary Report on Patentability, App. No. PCT/JP2013/075309, Filed Sep. 19, 2013, dated Apr. 2, 2015, 5 Pages.

PCT, Notification of Transmittal of Translation of the International Preliminary Report on Patentability, App. No. PCT/JP2013/075309, Filed Sep. 19, 2013, dated Apr. 2, 2015, 7 Pages.

International Search Report, Application No. PCT/JP2013/075309, Filed Sep. 19, 2013, dated Oct. 15, 2013, 4 Pages.

Notification Concerning Submission, Obtention or Transmittal of Priority Document, PCT/JP2013/075309, dated Nov. 13, 2013, 1 Page.

* cited by examiner

PRIOR ART

PRECOMBUSTION CHAMBER GAS ENGINE

FIELD

The present disclosure relates to a precombustion-chamber gas engine that combusts mixed air in a main combustion chamber by injecting combustion flames into the main combustion chamber through a plurality of nozzle holes. The combustion flames are produced in a precombustion chamber disposed inside a precombustion chamber cap.

BACKGROUND

Figure 4:
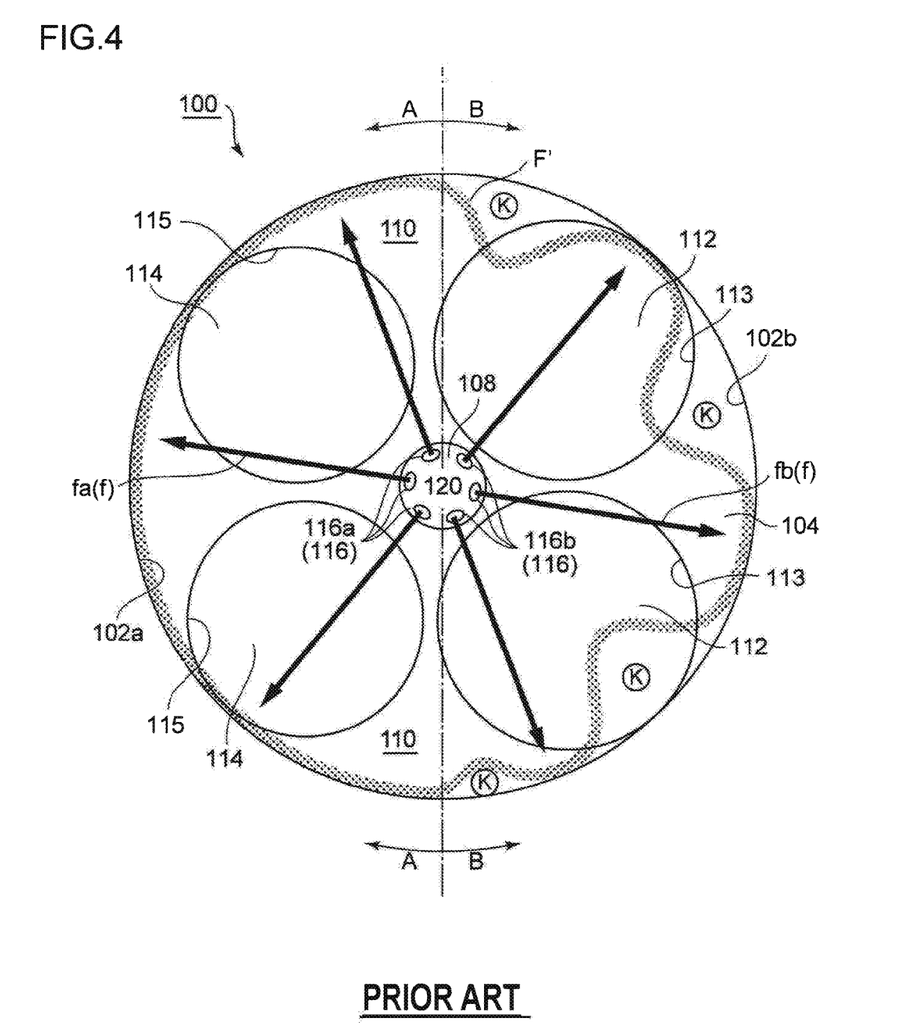
FIG. 4 is a planar view of a cylinder head of a conventional precombustion-chamber gas engine as seen from below.

FIG. 4 is a planar view of a cylinder head of a conventional precombustion-chamber gas engine as seen from below. This conventional precombustion-chamber gas engine 100 includes a precombustion chamber cap 108 disposed inside the cylinder head 104 at the center of the cylinder head 104, as illustrated in FIG. 4. Two intake ports 113 and two exhaust ports 115 are opened around the precombustion chamber cap 108 of the cylinder head 104 so as to surround the precombustion chamber cap 108. In FIG. 4, two intake ports 113 are opened on the right side of the drawing, while two exhaust ports 115 are opened on the left side of the drawing.

Furthermore, the above two intake ports 113 and two exhaust ports 115 are opened and closed by intake valves 112 and exhaust valve 114, respectively. The intake valves 112 open and close the intake ports 113 so that mixed air is supplied to the main combustion chamber 110 delimited between the cylinder head 104 and a top face of a non-illustrated piston. The exhaust valves 114 open and close the exhaust ports 115 so that exhaust gas in the main combustion chamber 110 is discharged.

A precombustion chamber 120 is delimited inside the precombustion chamber cap 108. The precombustion chamber cap 108 includes a plurality of nozzle holes 116 that brings the precombustion chamber 120 into communication with the main combustion chamber 110. Six nozzle holes 116 are provided at equal intervals in the circumferential direction. The combustion flames "f" (hereinafter, referred to as torch jets) produced in the precombustion chamber 120 are injected into the main combustion chamber 110 through the nozzle holes 116, thereby combusting mixed air in the main combustion chamber 110. The arrows here of the torch jets "f" in FIG. 4 indicate the injecting direction and the strength of the penetration force of the torch jets "f". The torch jets "f" in the drawing indicate that they are injected evenly in terms of space and at the same penetration force inside the main combustion chamber 110.

Patent Document 1, referred to later, is Japanese Unexamined Patent Application No. 2004-251213.

SUMMARY

Knocking tends to occur in a partial region of the main combustion chamber 110 in the conventional precombustion-chamber gas engine 100 with the above configuration. A cause includes uneven distribution of the flame propagation speed of the mixed air in the main combustion chamber ignited by the torch jets "f" due to the low temperature of the cylinder wall surface 102b in an intake-side region (region "B" in FIG. 4) where the intake ports 113 are provided compared to the temperature of the cylinder wall surface 102a in an exhaust-side region (region "A" in FIG. 4) where the exhaust ports 115 are provided.

In other words, the flame propagation speed of the mixed air is low in the intake-side region (B), where the mixed air is ignited by torch jets "fb" injected from the nozzle holes 116b disposed so as to face the intake-side region (B), as compared to the flame propagation speed of the mixed air in the exhaust-side region, where the mixed air is ignited by torch jets "fa" injected from the nozzle holes 116a disposed so as to face the exhaust-side region (A), corresponding to the low temperature of the cylinder wall surface in the intake-side region (B) compared to the exhaust-side region (A). Thus, as illustrated in FIG. 4, even immediately before the torch jets "fa" reach the cylinder wall surface 102a in the exhaust-side region (A), mixed air still remains as non-combusted gas in a partial region in the vicinity of the cylinder wall surface 102b having a low wall-surface temperature. Specifically, the partial region is the outside region of the flame surface F. This non-combusted gas self ignites to result in knocking (see reference sign "K" in FIG. 4), potentially.

Patent Document 1 discloses a combustion-chamber internal combustion engine that includes a main combustion chamber and a precombustion chamber, and nozzle holes are arranged outwardly in the radial direction by a half length or more of the radius, so that combustion flames securely reach a top clearance part where non-combusted gas is likely to be produced. Patent Document 1, however, does not prevent knocking due to the temperature difference between an intake-side region (B) and an exhaust-side region (A).

At least one embodiment of the present invention was made in view of the above issue. An object is to provide a precombustion-chamber gas engine where occurrence of knocking is restricted.

At least one embodiment of the present invention provides a precombustion-chamber gas engine including: a cylinder; a cylinder head disposed on a top portion of the cylinder; a piston reciprocably disposed inside the cylinder, the piston delimiting a main combustion chamber with the cylinder head; a precombustion-chamber cap disposed inside the cylinder head at the center part of the cylinder head, the precombustion-chamber cap delimiting a precombustion chamber inside the precombustion-chamber cap and including a plurality of nozzle holes through which the precombustion chamber is in communication with the main combustion chamber; an intake valve for supplying mixed air to the main combustion chamber by opening and closing an intake port that opens on the cylinder head; and an exhaust valve for discharging exhaust gas in the main combustion chamber by opening and closing an exhaust port that opens on the cylinder head. The main combustion chamber may be divided into two regions including an intake-side region having the intake port and an exhaust-side region having the exhaust port and defining at least one nozzle hole arranged to be oriented to the intake-side region as at least one intake-side nozzle hole and at least one nozzle hole arranged to be oriented to the exhaust-side region as at least one exhaust-side nozzle hole from among the plurality of nozzle holes disposed on the precombustion-chamber cap, in a planar view where the cylinder head is seen from below, a total nozzle-hole area of the at least one intake-side nozzle hole is larger than a total nozzle-hole area of the at least one exhaust-side nozzle hole.

In the precombustion-chamber gas engine with the above configuration, the total nozzle-hole area of the at least one intake-side nozzle hole is larger than the total nozzle-hole area of the at least one exhaust-side nozzle hole. Thus, the flames of the intake-side mixed air, having been ignited by torch jets injected from the intake-side nozzle holes, reach the cylinder wall surface in a shorter period of time. As a result, it is possible to restrict occurrence of knocking.

In other words, the above configuration includes following two cases. (1) In the first case, the number of the intake-side nozzle holes is larger than that of the exhaust-side nozzle holes, so that the propagation area of the flame propagating from the torch jet injected from each intake-side nozzle holes is narrow (i.e., the propagation distance is short). Thus, a combustion flame reaches the cylinder wall surface in a shorter period of time. (2) In the second case, the number of the intake-side nozzle holes is the same as that of the exhaust-side nozzle holes. Still, the total nozzle-hole area of the intake-side nozzle holes is larger than that of the exhaust-side nozzle holes, so that the penetration force of the torch jet injected from each intake-side nozzle hole is large and therefore the development distance of the torch jet is large, causing the propagation distance of the flames propagating from the torch jets to become short. Thus, a combustion flame reaches the cylinder wall surface in a shorter period of time.

Further, in the precombustion-chamber gas engine of one embodiment of the present invention, the number of the at least one intake-side nozzle hole is larger than the number of the at least one exhaust-side nozzle hole, and the at least one intake-side nozzle hole and the at least one exhaust-side nozzle hole each have an identical nozzle-hole area.

If the at least one intake-side nozzle hole and the at least one exhaust-side nozzle hole each have an identical nozzle-hole area as described above, forming the nozzle holes on the precombustion chamber cap is facilitated.

Further, in the precombustion-chamber gas engine of one embodiment of the present invention, the number of the at least one intake-side nozzle hole is equal to the number of the at least one exhaust-side nozzle hole, and each of the at least one intake-side nozzle hole has a nozzle hole area larger than a nozzle hole area of each of the at least one exhaust-side nozzle hole.

As described above, the number of the at least one intake-side nozzle hole is equal to the number of the at least one exhaust-side nozzle hole, and each of the at least one intake-side nozzle hole has a nozzle hole area larger than a nozzle hole area of each of the at least one exhaust-side nozzle hole. In this way, for instance, it is possible to form the precombustion chamber cap according to one embodiment of the present invention by only increasing the diameter of the nozzle holes arranged to face the intake-side region on a conventional combustion chamber cap where nozzle holes of an identical area are formed at equal intervals. Thus, it is possible to easily manufacture the precombustion chamber cap.

According to one embodiment of the present invention, it is possible to shorten the period of time in which the combustion flames injected from the intake-side nozzle holes reach the cylinder wall surface. Thus, it is possible to provide a precombustion-chamber gas engine in which occurrence of knocking is restricted.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
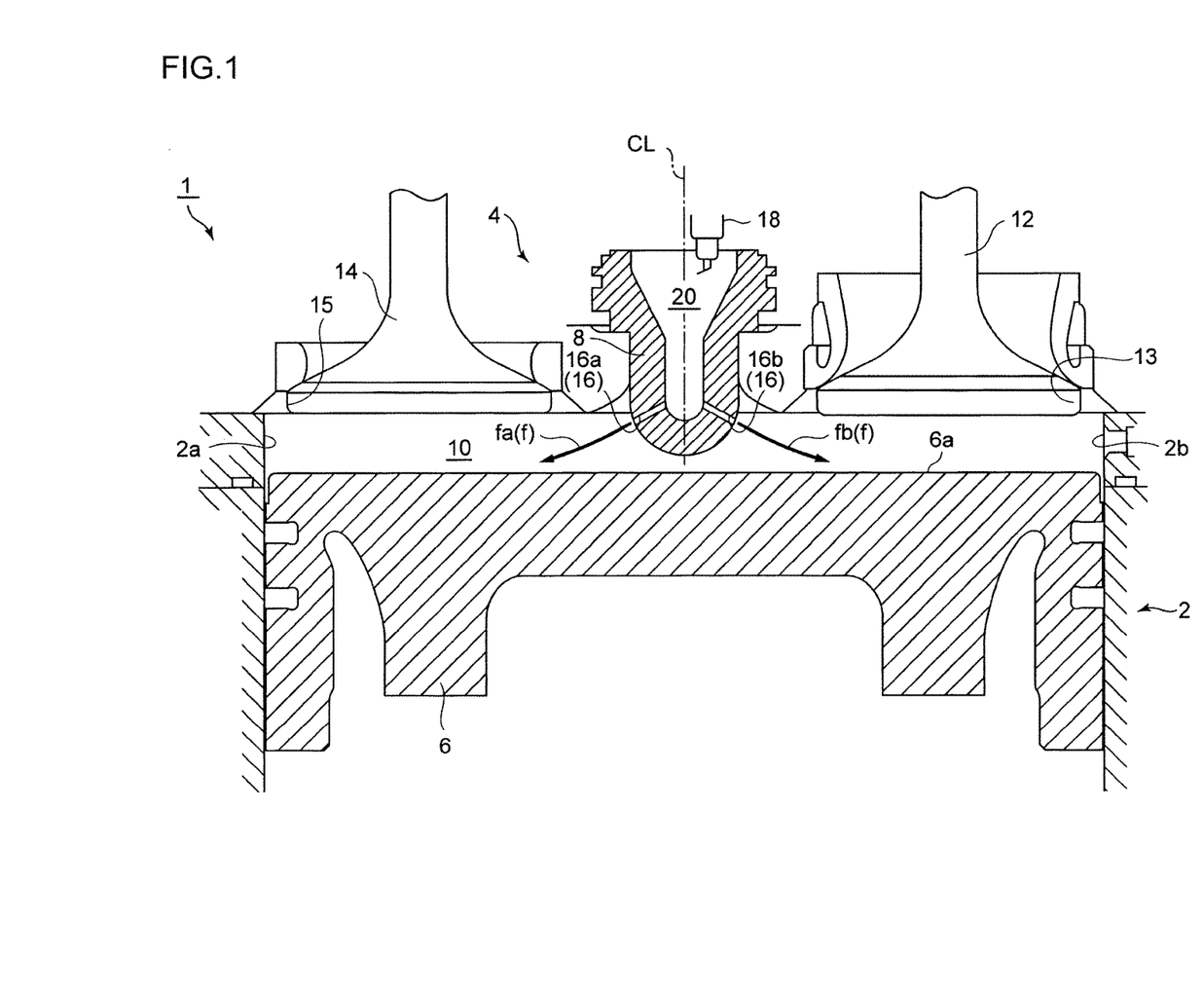
FIG. 1 is a cross-sectional view of a precombustion-chamber gas engine according to one embodiment of the present invention.
Figure 2:
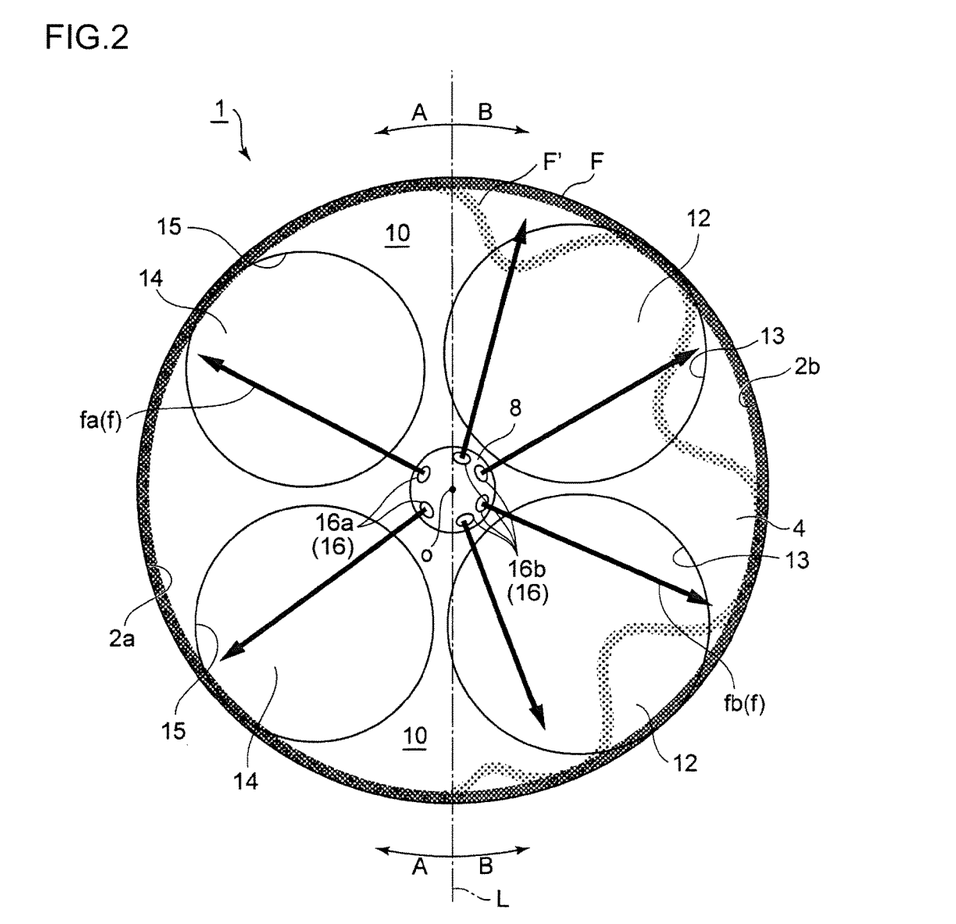
FIG. 2 is a planar view of a cylinder head of the precombustion-chamber gas engine according to one embodiment of the present invention as seen from below.

FIG. 1 is a cross-sectional view of a precombustion-chamber gas engine according to one embodiment of the present invention. FIG. 2 is a planar view of a cylinder head of the precombustion-chamber gas engine according to one embodiment of the present invention as seen from below.

As illustrated in FIG. 1, a precombustion-chamber gas engine 1 according to one embodiment of the present invention includes a cylinder 2 of a cylindrical shape, a cylinder head 4 disposed on the top of the cylinder 2, and a piston 6 disposed reciprocably inside the cylinder 2. A main combustion chamber 10 is delimited between the cylinder head 4 and the top face 6a of the piston 6.

Further, a precombustion-chamber cap 8 is provided inside the cylinder head 4 at the center part of the cylinder head 4. A precombustion chamber 20 is delimited inside the precombustion-chamber cap 8. An ignition plug 18 is disposed on the upper portion of the precombustion chamber 20, while a fuel-gas passage (not illustrated) is also connected to the upper portion. In this way, fuel gas for ignition is supplied to the precombustion chamber 20 through the fuel-gas passage. Further, the precombustion-chamber cap 8 is disposed inside the cylinder head 4 while having a portion projecting into the main combustion chamber 10. This projecting portion includes a plurality of nozzle holes 16 which brings the main combustion chamber 10 into communication with the precombustion chamber 20. In the present embodiment, six nozzle holes 16 are provided.

Further, intake ports 13 and exhaust ports 15 are each opened on the cylinder head 4. Supply valves 12 and exhaust valves 14 for opening and closing the intake ports 13 and the exhaust ports 15, respectively, are also disposed on the cylinder head 4.

The intake ports 13 are in communication with a gas mixer (not illustrated) in which fuel and air are premixed. Then, the intake valves 12 are opened in an intake stroke so that mixed air that has been premixed in the gas mixer is supplied to the main combustion chamber 10 through the intake ports 13.

Further, the exhaust ports 15 are in communication with an exhaust manifold (not illustrated.) The exhaust valves are open in an exhaust stroke so that the gas in the main combustion chamber 10 is discharged through the exhaust ports 15.

As illustrated in FIG. 2, two intake ports 13 and two exhaust ports 15 are disposed so as to encompass the periphery of the precombustion chamber cap 8. In the present embodiment, two intake ports 13 open at the right side of the drawing, while two exhaust ports 15 are disposed on the left side of the drawing.

Here, the main combustion chamber 10 is divided into two regions in a planar view in which the cylinder head 4 is seen from below, as illustrated in FIG. 4. The two regions are an intake-side region (B) including the intake ports 13 and an exhaust-side region (A) including the exhaust ports 15. In FIG. 2, a boundary L between the intake-side region (B) and the exhaust-side region (A) is defined as a straight line that passes through the center point O and evenly divides the main combustion chamber 10 into the intake-side region (B) including the two intake ports 13, and the exhaust-side region (A) including the two exhaust ports 15.

From among the plurality of nozzle holes 16 disposed on the precombustion chamber cap 8, the nozzle holes 16 oriented to the intake-side region (B) are defined as intake-side nozzle holes 16b, while the nozzle holes 16 oriented to the exhaust-side region (A) are defined as exhaust-side nozzle holes 16a.

In this case, in the precombustion-chamber gas engine according to one embodiment of the present invention, four intake-side nozzle holes 16b are arranged to be oriented to the intake-side region (B) and two exhaust-side nozzle holes 16a are arranged to be oriented to the exhaust-side region (A), from among the six nozzle holes 16 disposed on the precombustion-chamber cap 8, as illustrated in FIG. 2.

Further in this case, the above described four intake-side nozzle holes 16b and two exhaust-side nozzle holes 16a are each formed to have an identical nozzle-hole area. Thus, the total nozzle-hole area of the above two intake-side nozzle holes 16b is larger than the total nozzle-hole area of the above four exhaust-side nozzle holes 16a.

In the precombustion-chamber gas engine 1 with the above configuration according to one embodiment of the present invention, fuel gas for ignition supplied to the precombustion chamber 20 is ignited by the ignition plug 18 to produce a combustion flame in the precombustion chamber 20. The combustion flames produced in the precombustion chamber 20 are injected into the main combustion chamber 10 through the nozzle holes 16 to form torch jets "f". Then, the combustion flames ignite the mixed air in the main combustion chamber 10 so that flames propagate to cause combustion throughout the entire main combustion chamber 10.

In the present embodiment, the number of the intake-side nozzle holes 16b is larger than that of the exhaust-side nozzle holes 16a, so that the total nozzle-hole area of the intake-side nozzle holes 16b is larger than that of the exhaust-side nozzle holes 16a, as described above. If the number of the intake-side nozzle holes 16b is larger than that of the exhaust-side nozzle holes 16a as described above, the propagation region of the flame propagating from each injected torch jet "fb" through the intake-side region (B) is narrow (i.e., the propagation distance is short). Thus, the flames reach a cylinder wall surface 2b in a shorter period of time.

As a result, the temporal difference is small between the time in which the flames propagate from the torch jets "fb" injected from the intake-side nozzle holes 16b to reach the cylinder wall surface 2b of the intake-side region (B) and the time in which the flames propagate from the torch jets "fa" injected from the exhaust-side nozzle holes 16a to reach the cylinder wall surface 2a of the exhaust-side region (A). As illustrated in FIG. 2, the flame surface F reaches the cylinder wall surfaces 2a, 2b substantially at the same time in the intake-side region (B) and the exhaust-side region (A), unlike the conventional flame surface F'. As a result, occurrence of knocking in the vicinity of the cylinder wall surface 2b is restricted.

Further, in a case where the intake-side nozzle holes 16b and the exhaust-side nozzle holes 16a each have an identical nozzle-hole area as described above, it is possible to form nozzle holes 16 by opening holes of the same shape on the precombustion-chamber cap 8 when forming the nozzle holes 16 on the precombustion-chamber cap 8. Thus, forming the nozzle holes 16 on the precombustion-chamber cap 8 is facilitated.

Figure 3:
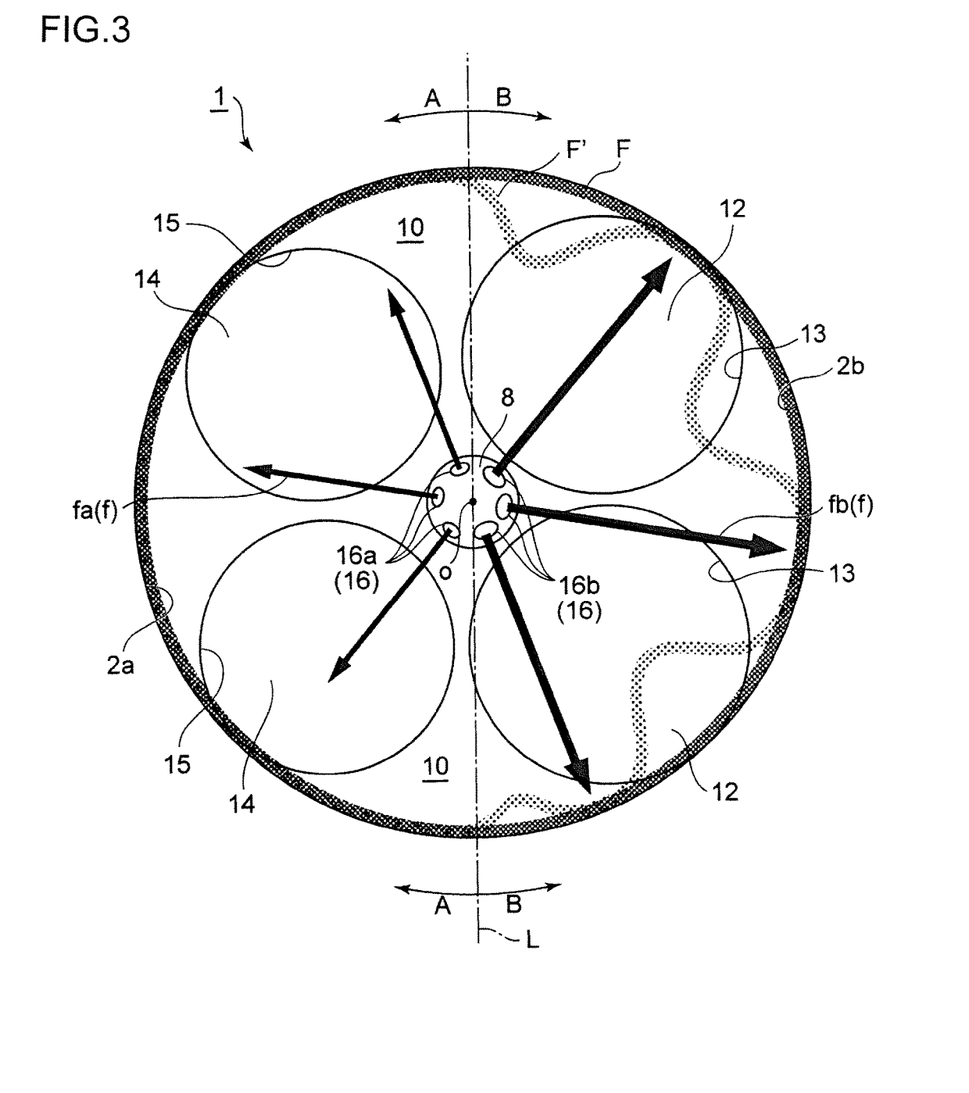
FIG. 3 is a planar view of a cylinder head of the precombustion-chamber gas engine according to one embodiment of the present invention as seen from below.

FIG. 3 is a planar view of a cylinder head of the precombustion-chamber gas engine according to one embodiment of the present invention as seen from below. The precombustion-chamber gas engine 1 of the present invention basically has the same configuration as that of the above described embodiment. Thus, the same components are indicated by the same reference signs to omit detailed description.

The precombustion-chamber gas engine 1 illustrated in FIG. 3 is different from the one in the above embodiment in that the nozzle holes 16 disposed on the precombustion-chamber cap 8 have different arrangement and shapes. Specifically, the precombustion-chamber cap 8 of the present embodiment includes six nozzle holes 16 similarly to the above embodiment. However, three intake-side nozzle holes 16b and three exhaust-side nozzle holes 16a are arranged and the nozzle-hole area of each intake-side nozzle hole 16b is larger than that of each exhaust-side nozzle hole 16a, unlike the above embodiment. That is, the nozzle-hole diameter of each of the above three intake-side nozzle holes 16b is larger than the nozzle-hole diameter of each of the above three exhaust-side nozzle holes 16a, so that the total area of the above intake-side nozzle holes 16b is larger than that of the above three exhaust-side nozzle holes 16a.

Here, the arrow of each torch jet "f" in FIG. 3 indicates the injecting direction and the strength of the penetration force of the torch jet "f". The arrows indicate that the torch jets "fb" injected from the intake-side nozzle holes 16b are injected with larger penetration forces than the torch jets "fa" injected from the exhaust-side nozzle holes 16a.

As described above, even though the number of the intake-side nozzle holes 16b is the same as that of the exhaust-side nozzle holes 16a, the penetration forces of the torch jets "fb" injected from the intake-side nozzle holes 16b into the intake-side region (B) are larger than the penetration forces of the torch jets "fa" injected from the exhaust-side nozzle holes 16a if the nozzle-hole diameter of each intake-side nozzle hole 16b is larger than that of each exhaust-side nozzle hole 16a, i.e., if the total nozzle-hole area of the intake-side nozzle holes 16b is larger than that of the exhaust-side nozzle holes 16a. Thus, the reach of each torch jet "fb" in the intake-side region (B) is long, and accordingly, the propagation distance of the flames propagating from the torch jets "fb" is short. As a result, the flames also reach the cylinder wall surface 2b in a short period of time.

In consequence, the temporal difference is small between the time in which the flames propagate from the torch jets "fb" injected from the intake-side nozzle holes 16b to reach the cylinder wall surface 2b of the intake-side region (B) and the time in which the flames propagate from the torch jets "fa" injected from the exhaust-side nozzle holes 16a to reach the cylinder wall surface 2a of the exhaust-side region (A). As illustrated in FIG. 3, the flame surface F reaches the cylinder wall surfaces 2a, 2b substantially at the same time in the intake-side region (B) and the exhaust-side region (A), unlike the conventional flame surface F'. As a result, occurrence of knocking in the vicinity of the cylinder wall surface 2b is restricted.

Further, in a case where the number of the intake-side nozzle holes 16b is the same as that of the exhaust-side nozzle holes 16a while the nozzle-hole area of each intake-side nozzle hole 16b is larger than that of each exhaust-side nozzle hole 16a, it is possible to form the precombustion-chamber cap 8 according to one embodiment of the present invention only by increasing the hole diameter of the nozzle holes 106 arranged to be oriented to the intake-side region (B) on the conventional precombustion-chamber cap 108 illustrated in FIG. 4, where nozzle holes having an identical area are formed at equal intervals, for instance. As a result, it is possible to easily manufacture the precombustion-chamber cap 8.

Embodiments of the present invention were described in detail above, but the present invention is not limited thereto, and various amendments and modifications may be implemented within a scope that does not depart from the present invention.

For instance, the present invention is not limited to the above embodiments where the following two cases are described. (1) In the first case, the number of the intake-side nozzle holes 16b is the same as that of the exhaust-side nozzle holes 16a, and the total nozzle-hole area of the intake-side nozzle holes 16b is larger than that of the exhaust-side nozzle holes 16a. (2) In the second case, the number of the intake-side nozzle holes 16b is larger than that of the exhaust-side nozzle holes 16a, and the nozzle-hole area of each intake-side nozzle hole 16b is the same as that of each exhaust-side nozzle hole 16a.

That is, the present invention may only require that the total nozzle-hole area of the intake-side nozzle holes 16b is larger than that of the exhaust-side nozzle holes 16a. For instance, there may be another case (3) where the number of intake-side nozzle holes 16b is larger than that of the exhaust-side nozzle holes 16a, and the total nozzle-hole area of the intake-side nozzle holes 16b is larger than that of the exhaust-side nozzle holes 16a.

At least one embodiment of the present invention provides a precombustion-chamber gas engine which combusts mixed air in a main combustion chamber by injecting combustion flames, produced in a precombustion chamber formed inside a precombustion-chamber cap, into the main combustion chamber through a plurality of nozzle holes. This precombustion-chamber gas engine can be used in, for instance, a power-generation gas engine in a thermal power generating plant.

The invention claimed is:

1. A precombustion-chamber gas engine, comprising:
   a cylinder;
   a cylinder head disposed on a top portion of the cylinder;
   a piston reciprocably disposed inside the cylinder, the piston delimiting a main combustion chamber with the cylinder head;
   a precombustion-chamber cap disposed inside the cylinder head at the center part of the cylinder head, the precombustion-chamber cap delimiting a precombustion chamber inside the precombustion-chamber cap and including a plurality of nozzle holes through which the precombustion chamber is in communication with the main combustion chamber;
   an ignition plug disposed in the precombustion chamber;
   an intake valve for supplying mixed air to the main combustion chamber by opening and closing an intake port on the cylinder head; and
   an exhaust valve for discharging exhaust gas in the main combustion chamber by opening and closing an exhaust port on the cylinder head,
   wherein premixed fuel and air is to be supplied to the precombustion chamber without passing through the main combustion chamber, and
   wherein each of the plurality of nozzle holes has a constant cross-sectional area from an opening on a side of the precombustion chamber to an opening on a side of the main combustion chamber, and
   wherein, the main combustion chamber being divided into two regions including an intake-side region having the intake port and an exhaust-side region having the exhaust port and defining at least one nozzle hole arranged to be oriented to the intake-side region as at least one intake-side nozzle hole and at least one nozzle hole arranged to be oriented to the exhaust-side region as at least one exhaust-side nozzle hole from among the plurality of nozzle holes disposed on the precombustion-chamber cap in a planar view if the cylinder head is seen from below,
   a total nozzle-hole area of the at least one intake-side nozzle hole being larger than a total nozzle-hole area of the at least one exhaust-side nozzle hole.

2. The precombustion-chamber gas engine according to claim 1,
   wherein the number of the at least one intake-side nozzle hole is larger than the number of the at least one exhaust-side nozzle hole, and the at least one intake-side nozzle hole and the at least one exhaust-side nozzle hole each have an identical nozzle-hole area.

3. The precombustion-chamber gas engine according to claim 1,
   wherein the number of the at least one intake-side nozzle hole is equal to the number of the at least one exhaust-side nozzle hole, and each of the at least one intake-side nozzle hole has a nozzle hole area larger than a nozzle hole area of each of the at least one exhaust-side nozzle hole.

4. A precombustion-chamber gas engine, comprising:
   a cylinder;
   a cylinder head disposed on a top portion of the cylinder;
   a piston reciprocably disposed inside the cylinder, the piston delimiting a main combustion chamber with the cylinder head;
   a precombustion-chamber cap disposed inside the cylinder head at the center part of the cylinder head, the precombustion-chamber cap delimiting a precombustion chamber inside the precombustion-chamber cap and including a plurality of nozzle holes through which the precombustion chamber is in communication with the main combustion chamber;
   an ignition plug disposed in the precombustion chamber;
   an intake valve for supplying mixed air to the main combustion chamber by opening and closing an intake port on the cylinder head; and
   an exhaust valve for discharging exhaust gas in the main combustion chamber by opening and closing an exhaust port on the cylinder head,
   wherein premixed fuel and air is to be supplied to the precombustion chamber without passing through the main combustion chamber,
   wherein each of the plurality of nozzle holes has a constant cross-sectional area from an opening on a side of the precombustion chamber to an opening on a side of the main combustion chamber, and
   wherein, the main combustion chamber being divided into two regions including an intake-side region having the intake port and an exhaust-side region having the exhaust port and defining at least one nozzle hole arranged to be oriented to the intake-side region as at least one intake-side nozzle hole and at least one nozzle hole arranged to be oriented to the exhaust-side region as at least one exhaust-side nozzle hole from among the plurality of nozzle holes disposed on the precombustion-chamber cap, in a planar view if the cylinder head is seen from below, a total nozzle-hole area of the at least one intake-side nozzle hole is larger than a total nozzle-hole area of the at least one exhaust-side nozzle hole, wherein a top surface of the piston is flat without having a recessed portion, and wherein the number of the at least one intake-side nozzle hole is larger than the number of the at least one exhaust-side nozzle hole, and the at least one intake-side nozzle hole and the at least one exhaust-side nozzle hole each have an identical nozzle-hole area, in such a manner that a flame propagating from each injected torch jet through the at least one intake-side nozzle hole reaches a cylinder wall surface of the cylinder in a shorter period of time than the case where the number of the at least one intake-side nozzle hole is equal to the number of the at least one exhaust-side nozzle hole.

5. The precombustion-chamber gas engine according to claim 4, wherein the ignition plug is disposed on the intake-side region, in a planar view if the cylinder head is seen from below.

\* \* \* \* \*